(12) United States Patent
Kosmyna et al.

(10) Patent No.: US 7,350,418 B2
(45) Date of Patent: *Apr. 1, 2008

(54) FLUID SUPPLY ASSEMBLY WITH MEASURING GUIDE

(75) Inventors: Michael Kosmyna, Toledo, OH (US); Ralph Wisniewski, Toledo, OH (US)

(73) Assignee: Illinois Tool Works, Inc., Glenview, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/835,028

(22) Filed: Aug. 7, 2007

(65) Prior Publication Data

US 2007/0267412 A1    Nov. 22, 2007

Related U.S. Application Data

(63) Continuation of application No. 11/339,956, filed on Jan. 26, 2006, now Pat. No. 7,263,893.

(60) Provisional application No. 60/648,478, filed on Jan. 31, 2005.

(51) Int. Cl.
*G01L 9/04* (2006.01)

(52) U.S. Cl. ........................................ 73/726

(58) Field of Classification Search .......... 73/426–429, 73/290 R, 726

See application file for complete search history.

(56) References Cited

U.S. PATENT DOCUMENTS

| | | | |
|---|---|---|---|
| 856,361 A | 6/1907 | Neiburg |
| D47,721 S | 8/1915 | Haley |
| 1,476,668 A | 12/1923 | Agnew, Sr. |
| 1,560,938 A | 11/1925 | Lund |
| 1,562,196 A | 11/1925 | Abrams |
| 1,590,172 A | 6/1926 | Thorberg |
| 1,703,384 A | 2/1929 | Birkenmaier |
| 1,722,101 A | 7/1929 | Little |
| 1,800,459 A | 4/1931 | Maclean |
| 1,843,269 A | 2/1932 | Capser |
| 2,263,843 A | 11/1941 | Gross |
| 2,612,404 A | 9/1952 | Anderson |
| 2,768,660 A | 10/1956 | Russell |
| 2,770,706 A | 11/1956 | Vogtle et al. |
| 2,972,438 A | 2/1961 | Kimbrough |
| 3,157,360 A | 11/1964 | Heard |

(Continued)

FOREIGN PATENT DOCUMENTS

CA    1 192 852    9/1985

(Continued)

OTHER PUBLICATIONS

Non-electrical Equipment for Potentially Explosive Atmospheres Part 1: Basic Method and Requirements; BSi (British Standards Institution) BS EN 13465-1:2001; European Standard Nov. 2001.

(Continued)

*Primary Examiner*—Jewel Thompson
(74) *Attorney, Agent, or Firm*—Dinsmore & Shohl LLP

(57) ABSTRACT

A fluid supply assembly having a measuring guide comprising a fluid container, a lid, and a measuring guide. A method of measuring fluid components in a fluid supply assembly is also described.

20 Claims, 6 Drawing Sheets

U.S. PATENT DOCUMENTS

| | | |
|---|---|---|
| 3,228,555 A | 1/1966 | Pinto |
| 3,236,459 A | 2/1966 | McRitchie |
| 3,255,972 A | 6/1966 | Hultgreen et al. |
| 3,378,183 A | 4/1968 | Cuellar Ferrer |
| 3,401,842 A | 9/1968 | Morrison |
| 3,432,104 A | 3/1969 | Kaltenbach |
| 3,464,590 A | 9/1969 | Giannettino |
| 3,554,450 A | 1/1971 | D'Muhala |
| 3,593,921 A | 7/1971 | Boltic |
| 3,595,464 A | 7/1971 | Harrison |
| 3,604,602 A | 9/1971 | Lee |
| 3,672,645 A | 6/1972 | Terrels et al. |
| 3,674,074 A | 7/1972 | Lavis |
| 3,757,718 A | 9/1973 | Johnson |
| 3,773,169 A | 11/1973 | Zahuranec et al. |
| 3,776,408 A | 12/1973 | Wald |
| 3,780,950 A | 12/1973 | Brennen |
| 3,892,306 A | 7/1975 | Bertaud |
| 3,934,746 A | 1/1976 | Lilja |
| 3,939,888 A | 2/1976 | Scarnato |
| 3,940,052 A | 2/1976 | McHugh |
| 4,043,510 A | 8/1977 | Morris |
| 4,087,021 A | 5/1978 | Cotugno |
| 4,094,432 A | 6/1978 | Zilbert |
| 4,122,973 A | 10/1978 | Ahern |
| 4,140,279 A | 2/1979 | Hawkins |
| 4,151,929 A | 5/1979 | Sapien |
| 4,159,081 A | 6/1979 | Demler et al. |
| 4,258,862 A | 3/1981 | Thorsheim |
| 4,269,319 A | 5/1981 | Rubens |
| 4,283,082 A | 8/1981 | Tracy |
| 4,298,134 A | 11/1981 | Lewis, Jr. |
| 4,300,684 A | 11/1981 | Smith et al. |
| 4,356,930 A | 11/1982 | Roper |
| 4,379,455 A | 4/1983 | Deaton |
| 4,383,635 A | 5/1983 | Yotoriyama |
| 4,388,997 A | 6/1983 | Grime |
| 4,405,088 A | 9/1983 | Gray |
| 4,433,812 A | 2/1984 | Grime |
| 4,442,003 A | 4/1984 | Holt |
| 4,534,391 A | 8/1985 | Ventimiglia et al. |
| 4,586,628 A | 5/1986 | Nittel |
| 4,609,113 A | 9/1986 | Seki |
| 4,634,003 A | 1/1987 | Ueda et al. |
| 4,752,146 A | 6/1988 | Buckle |
| 4,760,962 A | 8/1988 | Wheeler |
| 4,773,569 A | 9/1988 | Larsson |
| 4,805,799 A | 2/1989 | Robbins, III |
| 4,811,904 A | 3/1989 | Ihmels et al. |
| 4,909,409 A | 3/1990 | Shreve |
| 4,930,644 A | 6/1990 | Robbins, III |
| 4,936,511 A | 6/1990 | Johnson et al. |
| 4,946,075 A | 8/1990 | Lundback |
| 4,951,875 A | 8/1990 | Devey |
| 4,971,251 A | 11/1990 | Dobrick et al. |
| 5,035,339 A | 7/1991 | Meyersburg |
| 5,059,319 A | 10/1991 | Welsh |
| 5,060,816 A | 10/1991 | Robbins, III |
| 5,067,518 A | 11/1991 | Kosmyna |
| 5,069,389 A | 12/1991 | Bitsakos |
| 5,088,614 A | 2/1992 | Dumestre |
| 5,094,543 A | 3/1992 | Mursa |
| 5,143,294 A | 9/1992 | Lintvedt |
| 5,163,580 A | 11/1992 | Beach et al. |
| 5,167,327 A | 12/1992 | Mondello |
| 5,195,794 A | 3/1993 | Hummel, Jr. et al. |
| 5,209,365 A | 5/1993 | Wood |
| 5,209,501 A | 5/1993 | Smith |
| 5,253,781 A | 10/1993 | Van Melle et al. |
| 5,271,683 A | 12/1993 | Snetting et al. |
| 5,328,486 A | 7/1994 | Woodruff |
| 5,429,263 A | 7/1995 | Haubenwallner |
| 5,460,289 A | 10/1995 | Gemmell |
| 5,468,383 A | 11/1995 | McKenzie |
| 5,501,365 A | 3/1996 | Richiger et al. |
| 5,514,299 A | 5/1996 | Kalwara |
| 5,553,748 A | 9/1996 | Battle |
| 5,569,377 A | 10/1996 | Hashimoto |
| 5,582,350 A | 12/1996 | Kosmyna et al. |
| 5,601,212 A | 2/1997 | Lee |
| 5,617,972 A | 4/1997 | Morano et al. |
| 5,628,428 A | 5/1997 | Calhoun et al. |
| 5,655,714 A | 8/1997 | Kieffer et al. |
| D386,654 S | 11/1997 | Kosmyna |
| 5,713,519 A | 2/1998 | Sandison et al. |
| 5,727,699 A | 3/1998 | Gilcrease |
| 5,797,520 A | 8/1998 | Donahue |
| 5,803,367 A | 9/1998 | Heard et al. |
| 5,806,711 A | 9/1998 | Morano et al. |
| 5,810,258 A | 9/1998 | Wu |
| 5,816,501 A | 10/1998 | LoPresti et al. |
| 5,853,102 A | 12/1998 | Jarrett |
| 5,865,341 A | 2/1999 | Martin |
| 5,894,927 A | 4/1999 | Bennett |
| 5,918,815 A | 7/1999 | Wu |
| 5,975,346 A | 11/1999 | Imperato et al. |
| 6,012,651 A | 1/2000 | Spitznagel |
| 6,019,294 A | 2/2000 | Anderson et al. |
| 6,053,314 A | 4/2000 | Pittman |
| 6,053,429 A | 4/2000 | Chang |
| 6,123,222 A | 9/2000 | Richiger et al. |
| 6,136,396 A | 10/2000 | Gilmer |
| 6,165,159 A | 12/2000 | Blanton |
| 6,189,809 B1 | 2/2001 | Schwebemeyer |
| 6,196,410 B1 | 3/2001 | Hocking |
| 6,213,410 B1 | 4/2001 | Spitznagel |
| 6,257,429 B1 | 7/2001 | Kong |
| 6,302,445 B1 | 10/2001 | Kugele |
| 6,331,334 B1 | 12/2001 | Trepte et al. |
| 6,382,449 B1 | 5/2002 | Kazmierski et al. |
| 6,401,967 B1 | 6/2002 | Rabe et al. |
| 6,435,426 B1 | 8/2002 | Copp, Jr. |
| D466,755 S | 12/2002 | Henry |
| 6,516,799 B1 | 2/2003 | Greenwood et al. |
| 6,536,687 B1 | 3/2003 | Navis et al. |
| 6,572,179 B2 | 6/2003 | Dahl et al. |
| 6,588,681 B2 | 7/2003 | Rothrum et al. |
| 6,595,441 B2 | 7/2003 | Petrie et al. |
| 6,663,018 B2 | 12/2003 | Rothrum et al. |
| 6,698,670 B1 | 3/2004 | Gosis et al. |
| 6,702,143 B2 | 3/2004 | Wang |
| 6,718,664 B2 | 4/2004 | Williams |
| 6,736,538 B2 | 5/2004 | Bittner |
| 6,796,514 B1 | 9/2004 | Schwartz |
| 6,820,824 B1 | 11/2004 | Joseph et al. |
| 6,886,707 B2 | 5/2005 | Giraud |
| 6,976,604 B2 | 12/2005 | Connors et al. |
| 7,086,549 B2 | 8/2006 | Kosmyna et al. |
| 7,090,455 B2 | 8/2006 | Lamb |
| 7,093,714 B2 | 8/2006 | Huang |
| 7,165,732 B2 | 1/2007 | Kosmyna et al. |
| 7,219,811 B2 | 5/2007 | Kong |
| 7,263,893 B2 * | 9/2007 | Kosmyna et al. ............. 73/726 |
| 2002/0084273 A1 | 7/2002 | Ming |
| 2002/0134861 A1 | 9/2002 | Petrie et al. |
| 2002/0175171 A1 | 11/2002 | Stewart et al. |
| 2003/0006310 A1 | 1/2003 | Rothrum et al. |
| 2003/0006311 A1 | 1/2003 | Rothrum et al. |
| 2003/0209568 A1 | 11/2003 | Douglas et al. |
| 2003/0209573 A1 | 11/2003 | Bouic |
| 2003/0213857 A1 | 11/2003 | Schmon et al. |
| 2004/0016825 A1 | 1/2004 | Petrie et al. |
| 2004/0046051 A1 | 3/2004 | Santa Cruz et al. |
| 2004/0069791 A1 | 4/2004 | Neal |

| | | | |
|---|---|---|---|
| 2004/0256484 A1 | 12/2004 | Joseph et al. | |
| 2004/0256485 A1 | 12/2004 | Joseph et al. | |
| 2005/0242107 A1 | 11/2005 | Kosmyna et al. | |
| 2005/0263614 A1 | 12/2005 | Kosmyna et al. | |
| 2005/0263617 A1 | 12/2005 | Kosmyna et al. | |
| 2005/0279748 A1 | 12/2005 | Kosmyna | |
| 2006/0003059 A1 | 1/2006 | Tabora | |
| 2006/0017286 A1 | 1/2006 | Kosmyna et al. | |
| 2006/0043217 A1 | 3/2006 | Kosmyna et al. | |
| 2006/0049277 A1 | 3/2006 | Joseph et al. | |
| 2006/0102550 A1 | 5/2006 | Joseph et al. | |
| 2006/0144960 A1 | 7/2006 | Kosmyna et al. | |
| 2006/0180075 A1 | 8/2006 | Kosmyna et al. | |
| 2006/0180584 A1 | 8/2006 | Kosmyna et al. | |
| 2006/0226145 A1 | 10/2006 | Kosmyna et al. | |
| 2006/0249597 A1 | 11/2006 | Kosmyna et al. | |
| 2006/0283861 A1 | 12/2006 | Kosmyna et al. | |

FOREIGN PATENT DOCUMENTS

| | | |
|---|---|---|
| CA | 2 099 763 | 7/1992 |
| CH | 540 159 A | 2/1972 |
| CH | 688 082 A | 5/1997 |
| DE | 204036 | 11/1908 |
| DE | 29 00 998 A1 | 7/1980 |
| DE | 3507 734 A1 | 9/1986 |
| DE | 41 02 326 A1 | 7/1992 |
| DE | 42 09 258 A1 | 9/1993 |
| DE | 196 18 514 A1 | 11/1997 |
| DE | 201 17 496 U1 | 2/2002 |
| EP | 0 636 548 A1 | 2/1995 |
| EP | 0 678 334 A3 | 10/1995 |
| EP | 0 987 060 A1 | 3/2000 |
| EP | 0987060 | 3/2000 |
| EP | 1 210 181 B1 | 10/2003 |
| EP | 1 415 719 A1 | 5/2004 |
| EP | 1 424 135 A1 | 6/2004 |
| EP | 1 435 265 A2 | 7/2004 |
| EP | 1 368 129 B1 | 6/2005 |
| EP | 1 611 960 A1 | 1/2006 |
| FR | 1 282 085 | 12/1960 |
| FR | 2 639 324 A | 5/1990 |
| FR | 2 774 928 | 8/1999 |
| FR | 2774922 A1 | 8/1999 |
| FR | 2798868 A1 | 3/2001 |
| GB | 961 183 | 6/1964 |
| GB | 2 103 173 A | 2/1983 |
| GB | 2 170 471 A | 8/1986 |
| JP | 06 335643 | 12/1994 |
| JP | 7 289959 | 11/1995 |
| JP | 8 192851 | 7/1996 |
| JP | 10 7170 A | 1/1998 |
| JP | 2001 252599 | 9/2001 |
| WO | 92 11930 | 7/1992 |
| WO | 95 07762 | 3/1995 |
| WO | 95 11170 | 4/1995 |
| WO | 95 22409 | 8/1995 |
| WO | 98 00796 | 1/1998 |
| WO | 98 32539 | 7/1998 |
| WO | 99 06301 | 2/1999 |
| WO | 99 50153 | 10/1999 |
| WO | 01 12337 A1 | 2/2001 |
| WO | 02 072276 A1 | 9/2002 |
| WO | 02 085533 A1 | 10/2002 |
| WO | 03 006170 A2 | 1/2003 |
| WO | 03 045575 A1 | 6/2003 |
| WO | 03 082475 A1 | 10/2003 |
| WO | 03 095101 A1 | 11/2003 |
| WO | 03095100 A1 | 11/2003 |
| WO | 2004037431 A1 | 5/2004 |
| WO | 2004037432 A1 | 5/2004 |
| WO | 2004037433 A1 | 5/2004 |
| WO | 2004 052552 A1 | 6/2004 |
| WO | 2004060574 A1 | 7/2004 |
| WO | 2004060575 | 7/2004 |
| WO | 2005/070557 A1 | 8/2004 |
| WO | 2004082848 A1 | 9/2004 |
| WO | 2004 087332 A1 | 10/2004 |
| WO | 2004094072 A1 | 11/2004 |
| WO | 2004098785 A1 | 11/2004 |
| WO | 2005018815 A2 | 3/2005 |
| WO | 2005068220 A1 | 7/2005 |
| WO | 2005 075097 A1 | 8/2005 |
| WO | 2005077543 A1 | 8/2005 |
| WO | 2006/041589 A1 | 4/2006 |
| WO | 2006065850 A1 | 6/2006 |

OTHER PUBLICATIONS

Insulation Resistance Test of Parts of Enclosures of Plastic Materials; EN 50014: 1992; pp. 20-21; 1992.
Recommended Practice on Static Electricity; NFPA 77; 2000 Edition; pp. 77-3-77-11, 77-13-77-15, 77-20-77-21, 77-24-77-25, 77-31, 77-49, 77-51-77-54.
DeVilbiss Brochure: Tanks and Cups; 1997; pp. 1, 10.
DeVilbiss 2000 Service Bulletin (SB-21-058-F): 2 Gallon QMG Tanks (Galvanized); 2000; pp. 1-8; U.S.A.
DeVilbiss 2000 Service Bulletin (SB-21-062-F): 5, 10, 15 Gallon QMG Tanks (Galvanized); 2000; pp. 1-8; U.S.A.
DeVilbiss 2000 Service Bulletin (SB-21-064-F): 5, 10, 15 Gallon QMG Tanks (Stainless Steel); 1997; pp. 1-8; U.S.A.
Anti-Static and Conductive Plastics; ESD Materials Categories; Boedeker Plastics, Inc.; Shiner, Texas; http://www.boedeker.com; May 17, 2004.
Ryne, C. Allen; ESD Bags: To Shield or Not to Shield: What Type of Bag Should You Use?; Aug. 1999; ESD Systems; Marlboro, MA; http://esdtraining.esdsystems.com.
Typical Conductive Additives; RTP Company; http://rtpcompany.com; May 17, 2004.
Lilli Manolis Sherman; Polymers as Additives; Gardner Publications, Inc.; http://www.plasticstechnology.com/articles/200107fa1.html; May 17, 2004.
Markus C. Grob and Doris Eisermann; Permanent Antistats: New Developments for Polyolefin Applications; Best Paper-Polyolefins XI-1999; Ciba Specialty Chemicals Inc.; Basel Switzerland; http://www.pmad.org/tecpaper-pXI.html; May 17, 2004.
Steve Fowler; OHMS Per Square What?; ESD Journal—The ESD & Electostatics Magazine; http://www.esdjournal.com; May 17, 2004.
Antistatic Agent; About, Inc.; http://composite.about.com/library/glossary/a/bldef-a375.htm; May 17, 2004.
ANTISTATS; http://www.ampacet.com/tutorial/antistat/as_long.htm May 17, 2004.
ADDITIVES; http://www.csuchico.edu/~jpgreene/itec041/m41_ch05/tsld011.htm; May 17, 2004.

* cited by examiner

FLUID SUPPLY ASSEMBLY WITH MEASURING GUIDE

CROSS REFERENCE TO RELATED APPLICATION

This application is a continuation of U.S. application Ser. No. 11/339,956 filed Jan. 26, 2006 now U.S. Pat. No. 7,263,893 which is a non-provisional of U.S. Application Ser. No. 60/648,478 filed Jan. 31, 2005 each of which is incorporated herein by reference.

BACKGROUND OF THE INVENTION

The present invention is directed generally to a measuring guide for fluid components, and more particularly to a fluid supply assembly including a measuring guide for measuring components of a fluid in the fluid container for a fluid applicator.

Paint compositions for automotive refinishing often contain multiple components. The various components are measured, and then the mixture is poured into the spray gun's paint reservoir (commonly called the paint cup). Historically, the components were measured either on a scale, with a measuring cup, or with a measuring stick. The use of the scale allowed accurate measuring of the components, but the amounts needed had to be calculated, either by hand or by computer. The components were weighed in a mixing cup from which they were transferred to the paint cup. The mixing cup then had to be cleaned or thrown away. The measuring cup eliminated the calculation and weighing of the components, but it still had to be cleaned or disposed of after the paint components were poured into the paint cup. The measuring stick was placed either inside or outside the mixing cup to measure the components, and the mixing cup had to be cleaned or thrown away.

Newer designs provide disposable paint cups for the spray gun which allows measuring the components directly in the paint cup. For example, U.S. Pat. No. 6,588,681 describes a paint cup with an outer container, a disposable inner liner, and an indicating sheet with indicia for measuring the paint components between the container and the liner. The indicating sheet must be positioned carefully between the liner and the container so that the indicia for measuring are aligned accurately.

Other designs are described in U.S. application Ser. No. 10/760,079, which is incorporated herein by reference. The '079 application describes a fluid assembly including a reusable cup holder or frame and a disposable cup. In one arrangement, the measuring guide is printed on either the disposable cup or the reusable cup holder or both. The measuring guide can be molded in the side, printed on the side, a label can be attached to the side, or it can be supplied in some other fashion. Alternatively, the measuring guide has indicia printed on a clear, thin, flat, plastic sheet. The plastic sheet has connecting parts on opposite sides of the sheet, and can be formed into a cylinder. The measuring guide is placed on the table, and the disposable cup, or the reusable cup holder with the disposable cup in it, is placed inside the cylinder. After the paint components are measured, the disposable cup (and the reusable cup holder if present) is removed from the cylinder. This measuring guide improves visibility and accuracy in measuring the paint components. It eliminates the necessity for accurate placement of a label on the disposable cup or reusable cup holder. It also allows more direct viewing of the indicia than with the label (i.e., through the label, the reusable cup holder, and the disposable cup).

With these designs, a problem arises when the disposable cups are refilled before they have been completely emptied. There is no way to "zero" the measuring guide to add more paint. This makes refilling more difficult and subject to errors because the user must remember the "zero" point and adjust the guide's numbers.

Therefore, there is a need in the art for a measuring guide which is easy to use, and which allows accurate measuring even when the cup already contains some paint.

SUMMARY OF THE INVENTION

The present invention meets this need by providing a fluid supply assembly having a measuring guide. The fluid supply assembly includes a fluid container having an open upper end; a lid secured to the fluid container at the upper end, the lid having a fitting connected thereto, the fitting having an opening therethrough; and a measuring guide having indicia for measuring fluids, the measuring guide attached to the fluid container, the measuring guide being movable from a first vertical position to a second vertical position on the measuring guide.

The invention also relates to a method for measuring fluid.

DETAILED DESCRIPTION OF THE INVENTION

Figure 1:
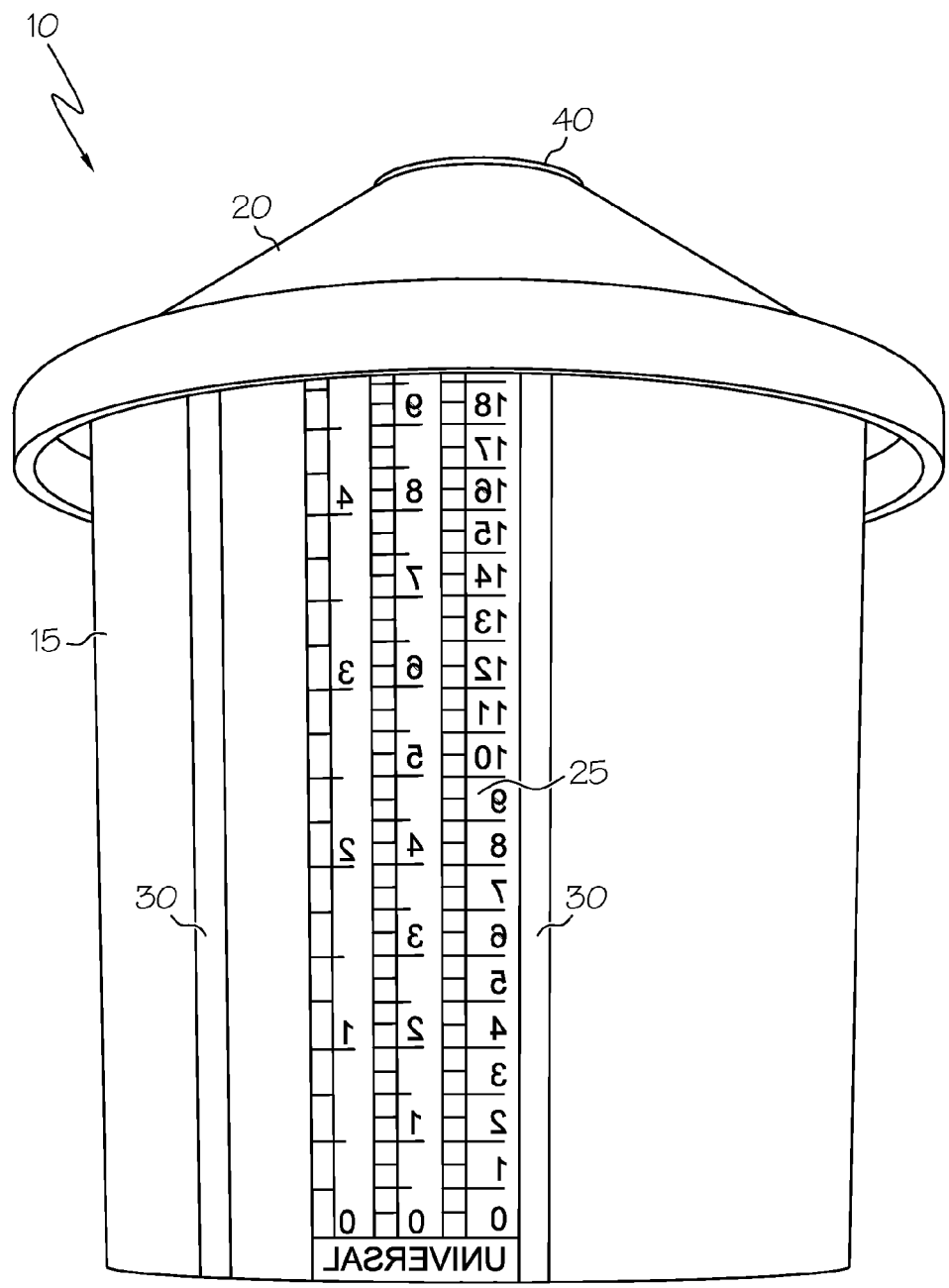
FIG. 1 shows one embodiment of the measuring guide attached to the fluid supply assembly.

FIG. 1 shows a fluid supply assembly 10. The fluid supply assembly includes a fluid container 15 and a lid 20. The lid 20 can be attached to the fluid container 15 using any suitable type of connection. Suitable connections include, but are not limited to, threaded connections, lugs and grooves, and pins and slots.

The measuring guide 25 is attached to the fluid container 15 in a manner which allows it to be moved from a first vertical position on the fluid container to a second vertical position. The channels 30 form a groove into which the measuring guide 25 fits. The channels 30 can extend outward from the side of the fluid container 15 to form the groove. Alternatively, a groove can be formed as an indent in the side of the fluid container. The measuring guide can be attached using other types of attachment allowing movement from one position to another, including, but not limited to, tabs and slots, pins and holes, pressure sensitive adhesive, static charge, etc.

Figure 2:
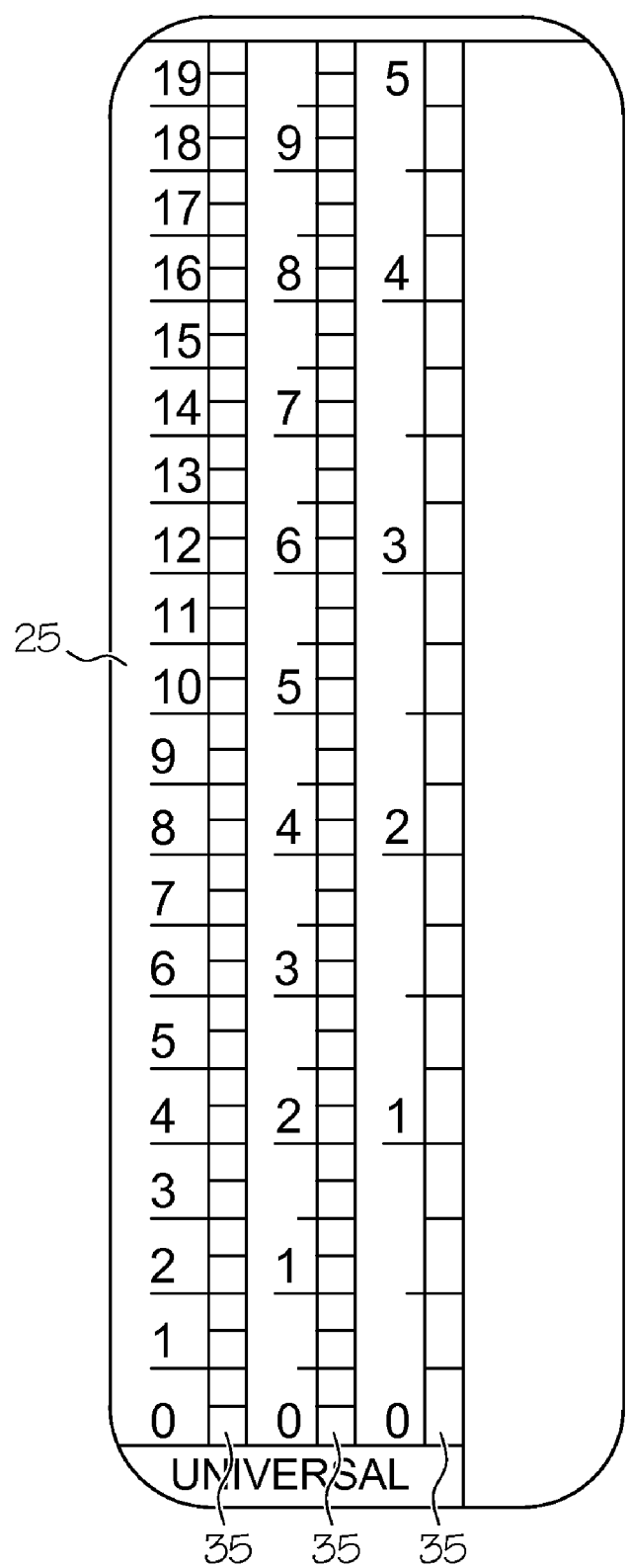
FIG. 2 shows one embodiment of a measuring guide useful in the present invention.

The measuring guide 25 has indicia for measuring fluids. The indicia 35 on the measuring guide 25 shown in FIG. 2 are 3 universal scales, i.e., scales with equal sized divisions. The first universal scale has 20 equal divisions, the second 10 equal divisions, and the third 5 equal divisions. There can be as many universal scales as needed (one or more) with whatever divisions are appropriate. Multiple universal scales allow the user to measure different amounts of fluid without using mixing ratio scales, which would not have to be included. The user could select the appropriate universal scale based on the amount of fluid needed. Alternatively, the indicia can include mixing scales with one or more mixing ratios, e.g., 4:1 mixing ratio, 2:1 mixing ratio; 3:2:1 mixing ratio, etc. Each mixing ratio might include one or more different sized divisions so that different amounts of fluid could be measured using each mixing ratio.

The measuring guide is typically flexible, but it could be rigid, if desired. Flexible measuring guides could typically be made of any suitable flexible material, including, but not limited to, flexible plastics. Rigid measuring guides could be made of any suitable rigid material, including, but not limited to rigid plastics, and metal. The measuring guide can be transparent, translucent, or opaque, if desired. If the guide is to be read from the inside of the cup, indicia printed on a white measuring guide may help block out "background noise" making it easier to read.

The arrangement shown in FIG. 1 is suitable for the initial measuring of fluids or for refilling the fluid container when all of the fluid has been dispensed (and the fluid container either has not been collapsed or has been restored to its original shape). The bottom of the measuring guide 25 is positioned at the bottom of the fluid container 15. The various fluids can be poured into the fluid container 15, either with or without the lid 20 being attached. If the lid 20 is attached, the fluid can be poured through an opening in a fitting 40. The fitting 40 can include a connection for attachment to a fluid dispenser, such as a paint sprayer.

Figure 3:
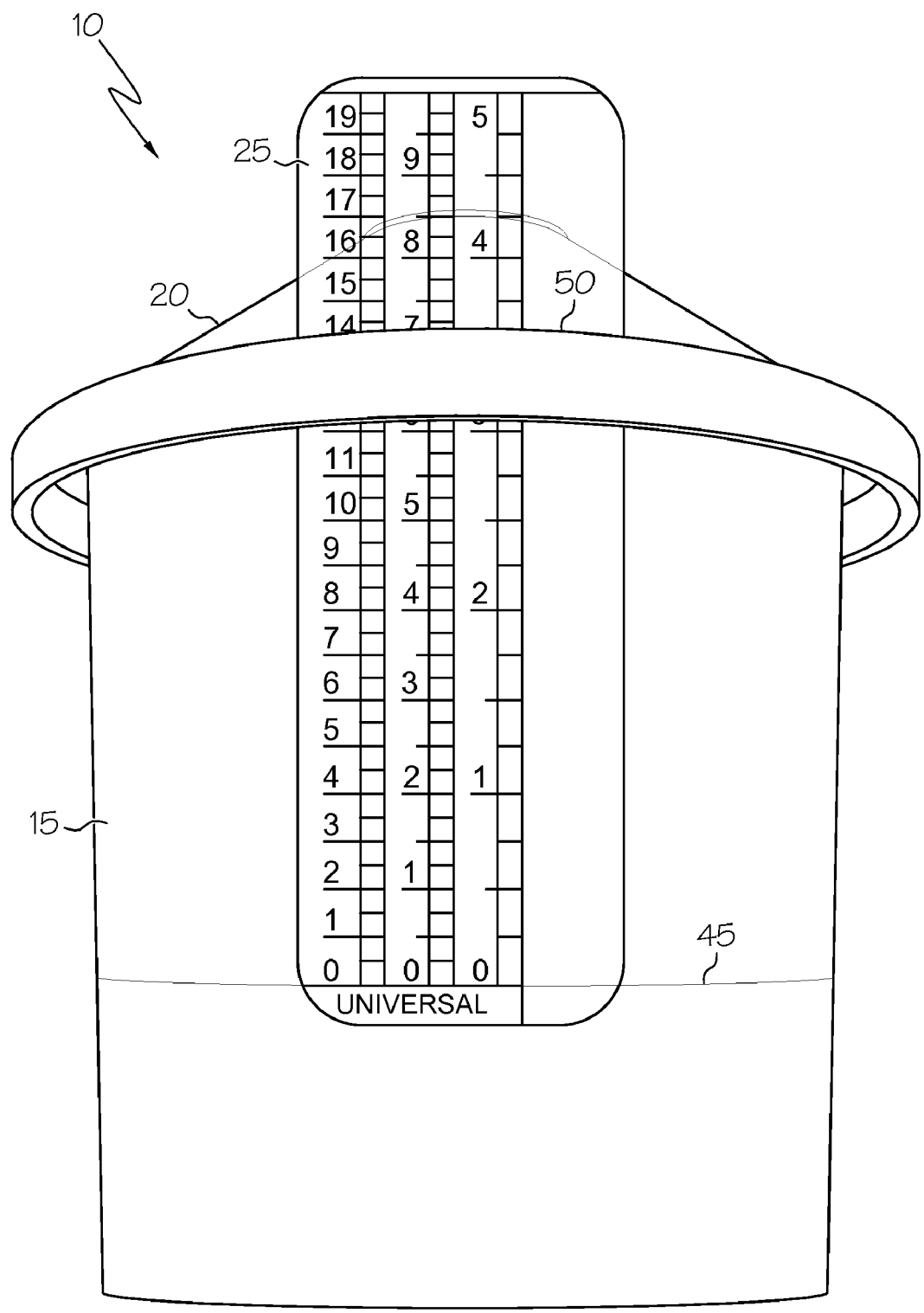
FIG. 3 shows the embodiment of claim 1 with the measuring guide adjusted upward to zero the measuring guide with respect to fluid remaining the fluid supply assembly.

The indicia 35 on the measuring guide 25 can face toward the inside of the container, as shown in FIG. 1, or toward the outside as shown in FIG. 3, if desired After fluid has been dispensed, it may be desirable to refill the fluid container 15 while some fluid remains in the fluid container without removing the lid 20. The fluid supply assembly 10 shown in FIG. 3 illustrates how this can be done (as long as the fluid container has not been collapsed). The measuring guide 25 has been moved upward so that the bottom of the measuring guide 25 is positioned at the level of the fluid 45. This allows "zeroing" the scale so that accurate measurements can be made despite the presence of fluid in the fluid container. The measuring guide 25 fits through a slot 50 in the lid (near the outside edge). The measuring guide 25 can be moved up or down in the slot 50 to the appropriate level.

The slot in the lid is typically curved and follows the curve of the lid. However, it can be straight, if desired. The slot has a length and width to hold the measuring guide and keep it from moving after it has been positioned. The slot can have a flexible tab or a flexible thin wall for additional support for holding the measuring guide, if desired.

Figure 4:
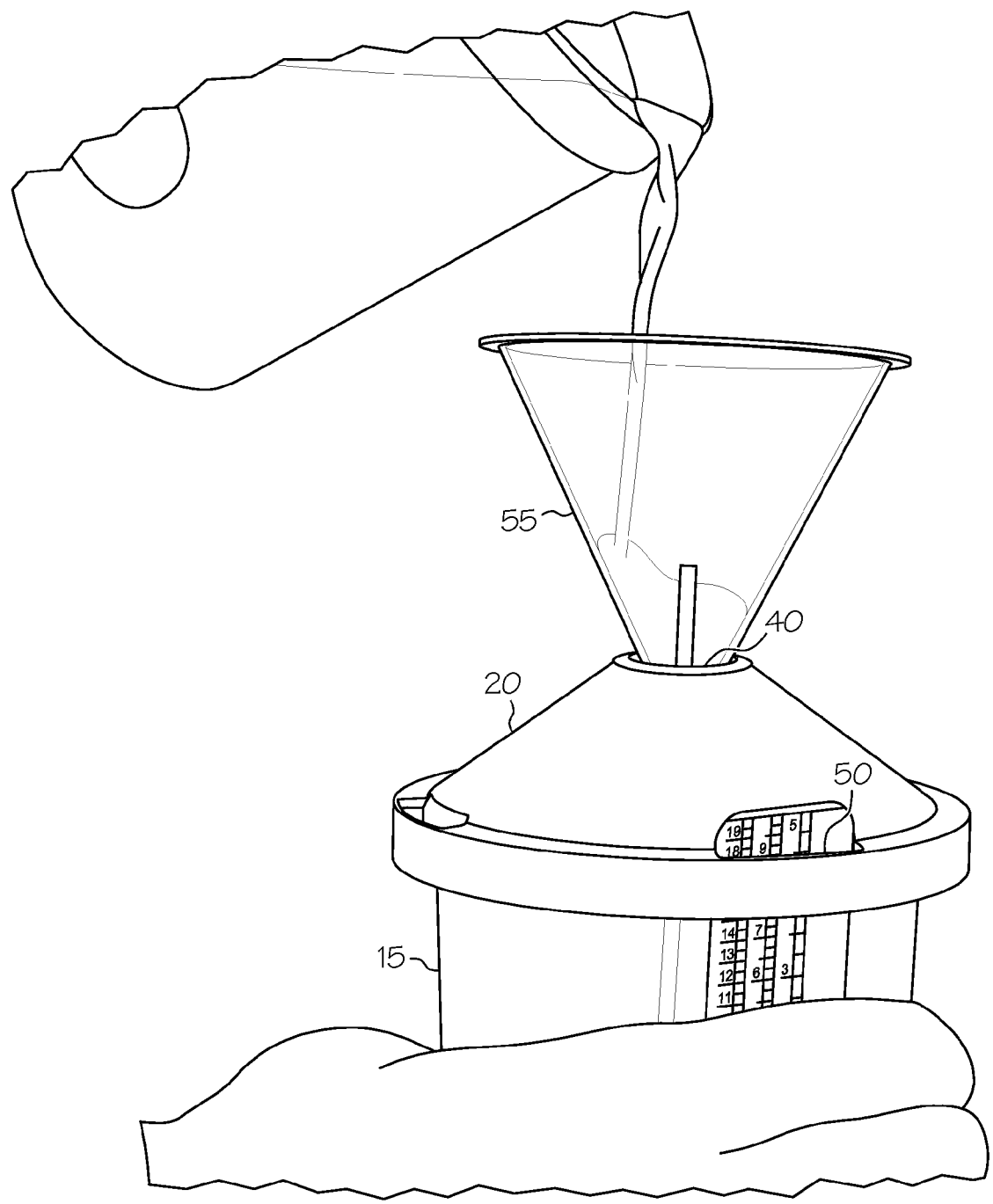
FIG. 4 shows fluid being added to the fluid supply assembly with the lid attached to the fluid container.

FIG. 4 shows the fluid supply assembly 10 being filled with fluid through the opening in the fitting 40. The fluid can be poured into the opening in the fitting using a funnel 55. Any suitable funnel can be used. The funnel described in U.S. application Ser. No. 10/834,500 is particularly useful.

Figure 5:
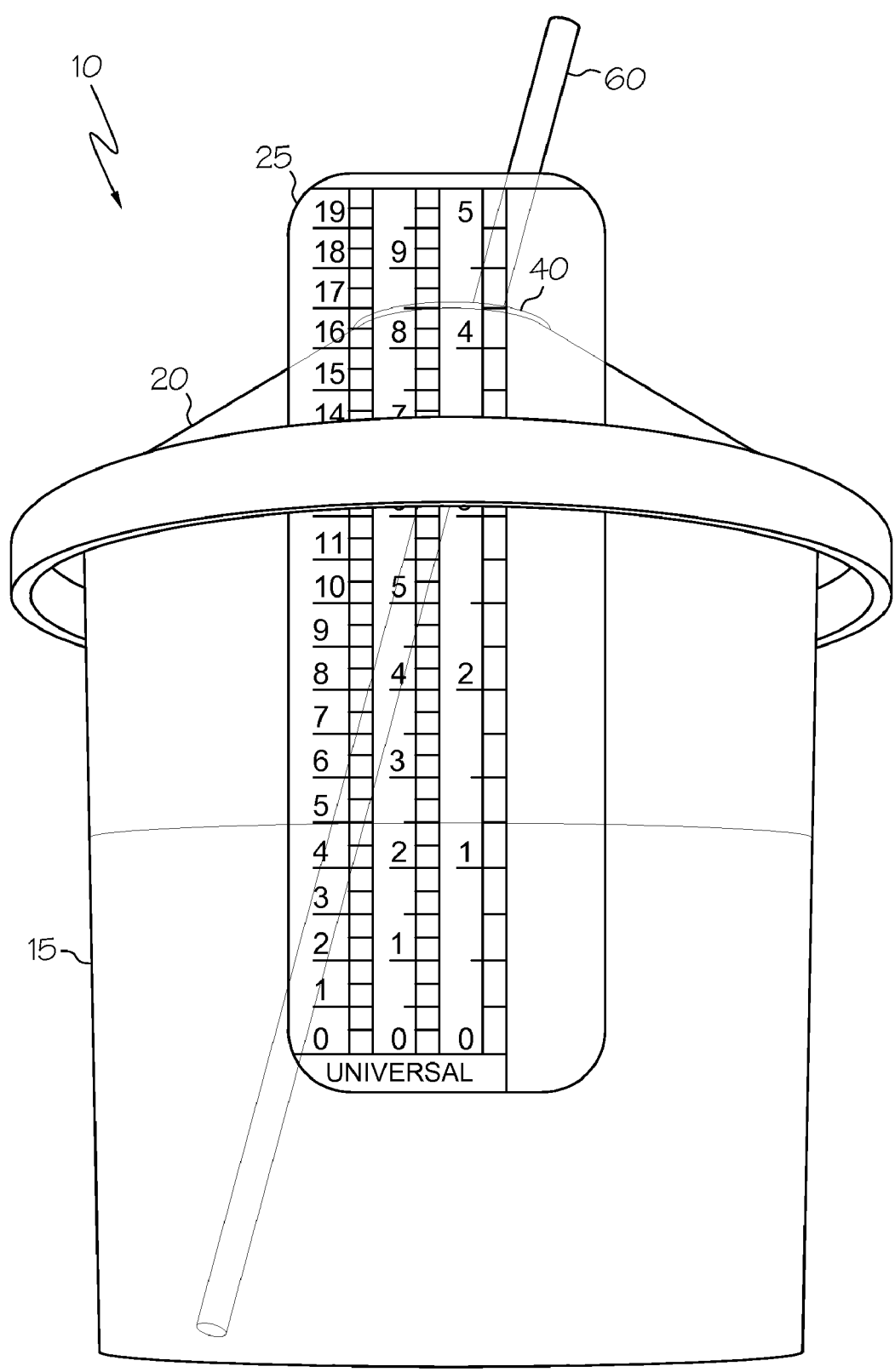
FIG. 5 shows the fluid supply assembly with a stirrer in the fitting of the lid.

FIG. 5 shows the fluid supply assembly 10 with a stirrer 60. The stirrer 60 is inserted through the opening in the fitting 40. This arrangement allows filling and stirring of the fluid without removing the lid 20. Any suitable stirrer can be used, as is known to those skilled in the art. One suitable stirrer is a disposable stirrer with a scoop or spoon on the bottom.

Figure 6:
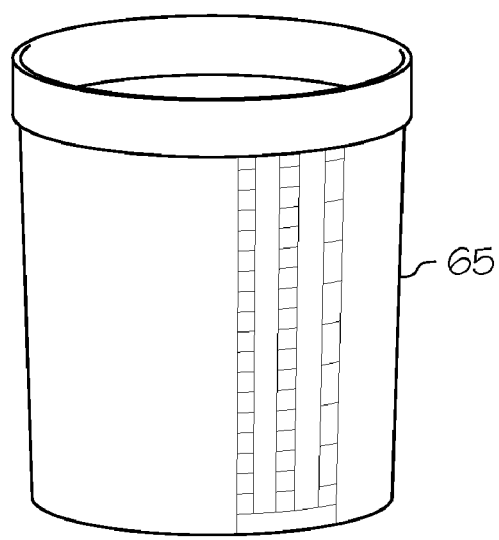
FIG. 6 shows one embodiment of a fluid container useful with the present invention.
Figure 7:
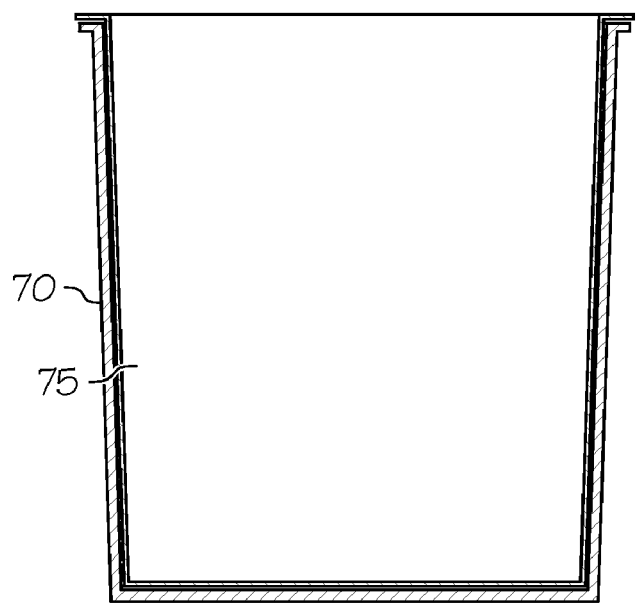
FIG. 7 shows another embodiment of a fluid container useful with the present invention.

The fluid supply assembly 10 can take a variety of forms, including, but not limited to, those shown in FIGS. 6-7. In one embodiment, the fluid container 65 can contain the fluid directly. Alternatively, the fluid container can be made of a reusable cup holder or frame 70 and a disposable cup 75 which fits inside the reusable cup holder or frame. The disposable cup 75 can be placed into the reusable cup holder or frame 70 before filling. The reusable cup holder or frame 70 can have different forms including, but not limited to, the same shape as the disposable cup with solid sides and solid bottom (with an opening somewhere to allow the disposable cup to collapse), solid sides and an open bottom (either completely open or partially open), or openings in the sides and a bottom which can be either open (completely or partially) or closed. It can have any suitable shape such as cylindrical, square, etc.

The fluid container can be flexible or rigid. If a disposable cup is used, it can be either flexible or rigid. If the fluid container itself or the disposable cup is rigid, a vent which can be opened for spraying and closed for filling should be included.

Spraying fluid from a flexible fluid container can result in partial or complete collapse of the flexible fluid container. A flexible fluid container will collapse less if the air is not purged prior to spraying. If the user will not be operating the sprayer upside down, purging of air is not necessary, and the flexible fluid container will maintain its shape better.

When a flexible fluid container is used (either the fluid container itself or the disposable cup in the reusable cup holder or frame), in order to refill the fluid container when there is fluid remaining, the fluid container should be restored to its original shape as much as possible before being refilled. Depending on how much fluid is left in the fluid container, the weight of the remaining fluid may restore the fluid container to its original shape. The user could also restore the shape using a stirrer or other implement to push the fluid container back to its original shape. Another method of restoring the shape of the fluid container involves the use of an air duster gun. The fluid container is placed on its bottom (with the sprayer upside down and the sprayer air (if any) disconnected). The trigger of the gun is pushed, and an air duster gun is placed over the tip of the sprayer. The air gun is gently triggered to blow air through the sprayer into the fluid container so that the fluid container is restored to its original shape, being careful not to overpressurize the fluid container.

One embodiment of a fluid supply assembly which includes a reusable cup holder or frame, a disposable cup, a reusable outer lid, and a disposable lid is described in U.S. application Ser. No. 10/760,079.

The measuring guide of the present invention is smaller than previous measuring guides, which reduces cost. In addition, if the fluid container includes a reusable cup holder or frame, the measuring guide can be attached to it, which reduces the likelihood of misplacing the measuring guide. Furthermore, the measuring guide can be "zeroed" on the fluid level in the fluid container, providing more accurate measurement when the fluid container is refilled while there is fluid remaining.

While certain representative embodiments and details have been shown for purposes of illustrating the invention, it will be apparent to those skilled in the art that various changes in the compositions and methods disclosed herein may be made without departing from the scope of the invention, which is defined in the appended claims.

What is claimed is:

1. A fluid supply assembly having a measuring guide comprising:
   a fluid container having an open upper end; and
   a measuring guide having indicia for measuring fluids, the measuring guide attached to the fluid container, the measuring guide being movable from a first vertical position on the fluid container to a second vertical position.

2. The fluid supply assembly of claim 1 wherein the fluid container comprises a reusable cup holder or frame and a disposable cup inside the reusable cup holder or frame.

3. The fluid supply assembly of claim 1 wherein the fluid container has a groove into which the measuring guide fits.

4. The fluid supply assembly of claim 1 wherein the fluid container and the measuring guide have complementary tabs and slots.

5. The fluid supply assembly of claim 1 wherein the fluid container and the measuring guide have complementary pins and holes.

6. The fluid assembly of claim 1 wherein the measuring guide has a pressure sensitive adhesive on one side.

7. The fluid supply assembly of claim 1 wherein the measuring guide is transparent.

8. The fluid supply assembly of claim 1 wherein the indicia comprises a universal scale.

9. A method of measuring fluid components in a fluid supply assembly comprising:
   providing a fluid container having an open upper end, a measuring guide attached to the fluid container, the measuring guide having indicia for measuring fluids, the measuring guide being movable from a first vertical position on the fluid container to a second vertical position;
   positioning the measuring guide on the fluid container at a first position;
   pouring fluid into the fluid container; and
   measuring the fluid in the fluid container using the measuring guide.

10. The method of claim 9 further comprising:
    moving the measuring guide to a second position on the fluid container at a level of fluid;
    pouring the fluid into the fluid container; and
    measuring the fluid in the fluid container using the measuring guide.

11. The method of claim 9 further comprising placing a lid on the fluid container at the upper end and securing the lid, the lid having a fitting connected thereto, the fitting having an opening therethrough.

12. The method of claim 11 wherein the lid is placed on the fluid container after the fluid is measured.

13. The method of claim 11 wherein the lid is placed on the fluid container before the fluid is measured, and wherein the fluid is added through the opening in the fitting in the lid.

14. The method of claim 11 wherein the lid includes a slot in the outer edge, the measuring guide fitting in the slot of the lid and capable of being moved vertically while in the slot.

15. The method of claim 9 wherein providing the fluid container comprises placing a disposable cup inside a reusable cup holder or frame.

16. The method of claim 9 wherein the fluid container has a groove into which the measuring guide fits.

17. The method of claim 9 wherein the fluid container and the measuring guide have complementary tabs and slots.

18. The method of claim 9 wherein the fluid container and the measuring guide have complementary pins and holes.

19. The method of claim 9 wherein the measuring guide has a pressure sensitive adhesive on one side.

20. The method of claim 9 wherein the measuring guide is releasably attached to the fluid container at a point above a bottom of the fluid container.

* * * * *